May 16, 1933.                R. F. MEYER              1,908,994
                           ORE BENEFICIATION
                          Filed March 30, 1932

```
    OXIDIZED ORE CONTAINING
    EXTRACTABLE METAL VALUES
    WITH CONTAMINATING HYDRO-
          LYZABLE SALT
                |
                |
         MADE QUASI-WET
                |
                |
      (slightly alkaline)
                |
                |
    TIME INTERVAL UNDER NON-
    ACID CONDITIONS (with air
    or other oxidizing agent)
      (with slight heating)
                |
                |
    CONDITIONED LOOSE ORE FOR
    HYDROMETALLURGICAL TREAT-
    MENT FREE FROM GELATINOUS
             MATERIAL.
```

INVENTOR

Ralph F. Meyer
by Brown, Critchlow & Flick
his attorneys.

Patented May 16, 1933

1,908,994

UNITED STATES PATENT OFFICE

RALPH F. MEYER, OF FREEPORT, PENNSYLVANIA, ASSIGNOR TO MEYER MINERAL SEPARATION COMPANY, OF PITTSBURGH, PENNSYLVANIA, A CORPORATION OF DELAWARE

ORE BENEFICIATION

Application filed March 30, 1932. Serial No. 601,988.

This invention pertains to the conditioning of oxidized ores for hydrometallurgical treatment, for example to improve their leaching and filtering qualities, or to improve the quality of solutions obtained by leaching such ores.

In treating ore containing metal values in soluble form it is general hydrometallurgical practice to apply considerable quantities of aqueous liquid for ultimate recovery of extractable values. Practical operations, however, frequently are subject to serious obstructions that are extremely difficult to combat in that hydrolytic reaction of water with hydrolyzable salts contained in ores may cause the formation of gelatinous products distributed extensively in slimy condition throughout the mass of water and ore. Iron salts exemplify the soluble compounds that hydrolyze readily to form interfering gelatinous precipitates. Heat accelerates the formation of these interfering precipitates.

There are different stages of treating ore with water in which such interference is encountered. For instance, leaching, to be commercially successful, requires that the extracting liquid penetrate the ore particles freely, and that subsequently the solution drain readily from the gangue, so as to remove dissolved values economically; but serious congestion of liquid passages and retardation of flow results from the gelatinous hydrates referred to. Also, there are other hydrometallurgical steps that frequently are hindered by hydrolytic reaction of aqueous liquid in which these steps are conducted; for example, in classification of ore with liquid to separate the fines from coarser particles, or to assort the mineral contents, as for instance to separate free gold from metal compounds. Here the gelatinous network arising from hydrolysis not only may impede the flow of liquid and its classifying effects, but also may entrap solid particles that should be separated from each other.

In ore extraction this interference is most apparent perhaps in the step of filtration, for satisfactory operating efficiency requires that a filter continuously permit relatively free flow between solution and gangue.

Further, it is essential to many processes of actual final separation of the metal that the metalliferous solution be free from even small amounts of interfering compounds, such as salts of iron. It is within present skill in the art to purify the solution itself so as to eliminate these contaminating salts, but such purification is an added expense, often it may require involved or tedious procedures, and it entails difficult problems of filtration. If the metalliferous solution is not an exceedingly pure one the actual recovery of metal, as by electrolysis, may be impaired and the product contaminated.

It is among the objects of this invention to minimize or eliminate entirely these difficulties of hydrometallurgical treatment and to render innocuous hydrolyzable compounds of metals such as iron, arsenic, antimony, etc., which interfere with hydrometallurgical treatment, in preparation for treating ore with aqueous liquid of non-acid character. Wherever used herein the term non-acid is hereby defined as meaning substantially neutral, or only slightly acid or slightly basic.

In the accompanying drawing is shown a flow sheet illustrative of steps in the process according to this invention.

This invention is predicated upon my discovery that the disadvantageous properties of hydrolyzable salts which interfere with hydrometallurgical treatment of ore may be eliminated by hydrolyzing those salts in the presence of minimal amounts of water, so that the resulting precipitates, rather than extending in net-like gelatinous condition throughout a mass of water and ore particles, are retained in the relatively dry ore particles in a form such that they do not interfere with subsequent treatment, and such that the ore is in a condition suitable for hydrometallurgical treatment.

In the practice of the invention, comminuted oxidized ore is conditioned for hydrometallurgical treatment by being brought to a limited degree of moistness, explained hereinafter, and it is then retained under substantially non-acid conditions to convert hydrolyzable interfering salts to insoluble oxycompounds or oxides. Preferably the moistened ore is contacted with oxidizing gas to assure that soluble iron and the like are in the higher valent, or -ic, form. It is desirable to elevate the temperature somewhat to accelerate this conditioning of quasi-wet ore, though the action proceeds acceptably at atmospheric temperature. One mode of obtaining non-acid conditions is to remove free acid liberated during the treatment. Ore so conditioned is an apparently dry product of somewhat loose, friable character, is sandy and permeable rather than slimy, and is excellent, physically and chemically, for leaching and for other treatment that requires considerable volumes of aqueous liquid.

The material amendable to this treatment may vary extensively in character, but generally is of oxidized nature. Such material may occur naturally, as for example some copper sulfate ores, or may have been produced by metallurgical treatment. The term oxidized ores as used herein includes ores that have been subjected to salt-forming conditions, such as sulfating or chloridizing, for example, and in practice many of the most important ores to be conditioned according to this invention are such as have been treated, whether as sulfide and the like or not, to form leachable salts of the metal contents. Such ores are characterized by containing small amounts of hydrolyzable salts which may interfere with subsequent hydrometallurgical treatment, and in general they contain some amount of metal oxide also. Also they may contain residual amounts of unconverted compounds of sulfide nature.

The invention is particularly applicable to ores preliminarily treated by the process described in my Patent No. 1,822,995, issued September 15, 1931, which by direct, low temperature treatment with acidic gases, yields a product high in water soluble chloride or sulfate. However, this invention is not at all restricted to the treatment of ores treated in that manner.

In the practice of the invetnion such ore is conditioned before leaching or other hydrometallurgical treatment by mixing it with water limited in amount to that required to render the ore quasi-wet. The amount of water required for quasi-wetting varies with different ores from traces to about ten or fifteen per cent, but is readily ascertainable by observation in any particular instance. For example, quasi-wet ore occupies more volume than either before water is added or when liquid is present in excess of the quasi-wet condition. The amount of moisture in this range is such that free liquid is absent from the interstices of the ore, and that no appreciable volume of liquid exists over even its individual particles. Evidently only minute films of liquid exist on the particle surfaces, so that the ore is not appreciably moist to sight or touch. It requires considerable hand pressure to compact it, but it easily crumbles again. The loose, open structure of ore in such friable and permeable condition assists this optimum moisture content in the insolubilizing reactions of easily hydrolyzable salts during conditioning.

Circumstances may alter the manner of attaining the quasi-wet condition of ore. It is preferable to introduce the water as free liquid to initiate the surface conditions that exist wtih quasi-wet ore particles. However, where the ore contains dehydrated salts, which have a high affinity for water, either steam, moist air or water vapor provide an atmosphere that is effective for quasi-wetting the ore and hydrolyzing the interfering salts. The presence of steam serves also to minimize the escape of water from the ore and to prolong the quasi-wetness of the mixture so that even above 100° C. moisture for hydrolysis is retained by the ore particles.

In introducing water, it is desirable to agitate the ore to equalize its distribution, to avoid localized agglomeration, lumping, or sliming. This depends, however, largely on the manner of adding the water, for with fine sprays or with steam condensation relatively little agitation of the ore is required. Coarse ore can be conditioned by maintaining a moist atmosphere, and ore of various sizes may be made quasi-wet, but it is placed in quasi-wet condition and treated with particular readiness when chiefly in the form of particles not larger than about 20 standard mesh. Ore as fine as 200 standard mesh readily acquires excellent condition when quasi-wet, and, in general, the finer the ore particle, the more water may be taken up within the range of quasi-wetness and with retention of the benefits of this invention.

After the ore has been subjected to limited moistening conditions, it is retained for a time under substantially non-acid conditions in order that the hydrolyzable salts may react with the moisture to form insoluble compounds in the ore. The hydrolyzing reactions occur at atmospheric temperature, but the treatment may be accelerated by elevation of temperature, and even at approximately 250° C. sufficient water may be retained by the ore particles to hydrolyze the small amounts of contaminating salts usually encountered in commercial practice. In general, temperatures from normal atmospheric to about 200 or 225° C. may be applied satisfactorily, although the most desirable results are had by heating the ore to about 150 to 200° C. Such hydrolyzing treatment at elevated temperatures is favored by ore in bulk or in relatively thick layers, to retard the escape of moisture. Repeated moistening and drying in some cases increase the effectiveness of treatment according to this invention.

The use of elevated temperatures is desirable because it reduces the time of treatment. It is desirable also for the reason that the compounds formed by hydrolysis of the hydrolyzable salt are affected by heat, being changed to a deflocculated form, and even being converted readily to dehydrated insoluble oxide compounds.

I have discovered further that when the hydrolyzable compounds are salts of metals capable of existing in -ous and -ic conditions, e. g. iron, hydrolysis proceeds with particular rapidity if such salts are present in the -ic, or higher valent, condition. To this end the quasi-wet ore is preferably contacted with an oxidizing agent, advantageously a gas such as air, or ozone, to convert any -ous hydrolyzable salt to its -ic form. Chlorine and air-chlorine mixtures are most suitable for this purpose, as chlorine acts more rapidly than oxygen in this connection. For the purposes of this invention chlorine may be considered to be non-acidic. Other oxidizing agents may be used also, such, for example, as nitric acid, or solid agents, either soluble or insoluble in water. For instance, manganese dioxide, which is insoluble in water, will readily oxidize ferrous salts to ferric salts under quasi-wet conditions. Obviously, such insoluble agents are mixed with the ore, while soluble agents may, if desired, be added in the form of solutions used to effect quasi-wetting. Agents such as nitric acid may be used in the form of their aqueous solutions, or ore quasi-wet with water may be contacted with an atmosphere of appropriate nitrogen oxide. Chlorine gases derived from a chloridizing roast are also suitable for oxidizing purposes.

Since the hydrolyzing reaction frees acid from the reacting salt, the conditioning treatment is favored by maintaining the ore under substantially non-acid conditions, i. e. by removing the free acid released during treatment. By so doing hydrolysis will continue to completion even though a slightly acid condition exists in the ore. In many ores there persist through prior treatments sufficient metal oxides to take up released acid. Thus oxides of copper or nickel may serve to prevent the development of too strong acid conditions, and since such metals frequently are the ones to be recovered by leaching, the efficiency of metal extraction is increased by this conditioning treatment. Under neutral conditions, or under the conditions of slight acidity that may develop by hydrolysis, this increase in solubility of the metals to be extracted, which may be as much as five or six percent, is a valuable result of this invention. Coincidentally with such solubilizing of residual metal value oxides, precious metals, such as gold and platinum, are made soluble to a considerable extent, although silver is not, in general affected.

If the released acid is volatile, like hydrogen chloride, any free acid may be, and preferably is, removed to maintain substantially non-acid conditions, by a current of gas flowed in contact with the ore. Any non-acid gas which does not act harmfully on the ore may be used, but especial benefit attends the use of oxidizing gases, for instance air and chlorine. These act in a dual capacity, not only to sweep out the free acid released during treatment, but also serve to insure that the hydrolyzable salt is present in its -ic state.

It is often desirable in practice to improve or accelerate the treatment by adding an agent adapted to combine with the acid radical of the hydrolyzable salt. In one embodiment of this aspect of the invention alkaline earth metal carbonate, such as calcium carbonate, may be added to neutralize the released acid. Other equivalent agents will be apparent to those skilled in the art, having regard for the fact that strongly alkaline conditions would not be desirable because of resulting chemical reactions that would cause precipitation from salts that are to be recovered, such for instance as precipitation from copper sulfate or nickel chloride. And even though calcium carbonate be present, extraneous acidifying conditions are to be avoided, including excessive quantities of carbon dioxide, for they would tend to cause solution of calcium carbonate and thus result in precipitating compound of the metals that are to be recovered, such as of copper or nickel. It is evident that during subsequent hydrometallurgical treatment as well as during this conditioning of the ore such strong acid conditions are to be avoided as would dissolve the precipitated hydrolyzed compounds. That is, the conditioning is suited particularly for subsequent slightly acid, neutral or alkaline solution treatment.

In conditioning ore containing metal values to be recovered and containing hydrolyzable contaminating salts, the invention may be practiced advantageously with a moving stream of ore, as for instance by passing the quasi-wet ore through a conventional rotary drum, which provides for agitation, and/or continuous operation. The moistened ore is heated progressively to accelerate the reactions, e. g. to 150° C., or even to 200° or 225° C., while applying a current of gas for the purposes described hereinabove. Advantageously steam is contained in the atmosphere to prolong the retention of moisture in the quasi-wet ore particles. There is an important advantage in causing the ore and the stream of gas to flow countercurrently, in that this avoids any increase in acidity of the ore in the regions where the reactions are complete, or nearly complete.

By way of further illustration of this invention, reference is made to the following specific examples.

An ore containing 4.0 percent of nickel after chloridizing contained 3.72 percent of water-soluble nickel, 0.17 percent of soluble copper, and 0.78 percent of soluble iron. The chloridized ore was made quasi-wet by the addition of 6 percent of water, and the mixture was exposed to air at 60° to 70° C. for four hours with occasional agitation. The resultant material was in excellent physical condition for leaching, and the treatment reduced the soluble iron to 0.12 percent. Also, some residual insoluble nickel was solubilized, for the treated ore contained 3.84 percent of soluble nickel. The soluble copper was not affected.

Another lot of chloridized nickel ore contained 3.85 percent of water soluble nickel, 0.18 percent of soluble copper, and 0.98 percent of soluble iron. This ore required 8 to 10 percent water to make a quasi-wet mixture. One portion was made quasi-wet and agitated continuously for 3 to 5 hours at 60° C., with exposure to air. The soluble iron was decreased thus to 0.17 percent. A second part was made quasi-wet after being mixed with 50 percent of the amount of $CaCO_3$ theoretically necessary to combine with the chlorine content of the soluble iron. This portion was treated at 70° C. with air, and with occasional agitation. The conditioned product was in the firm, loose condition that characterizes the product provided by the invention, and the soluble iron was almost eliminated, being decreased to but 0.02 percent. A third lot of ore, made quasi-wet, was allowed simply to stand in contact with air at atmospheric temperature for two weeks. As a result the soluble iron was decreased to 0.19 percent.

Another nickel ore after chloridizing contained 2.62 percent of water soluble nickel, and 0.52 percent of soluble iron, together with some residual nickel oxide. The ore was made quasi-wet and mixed with $CaCO_3$ equivalent to the chlorine of the iron, and allowed to stand in a vat for 48 hours. As a result the water soluble nickel content rose to 2.80 percent, while the soluble iron content became nil.

Another ore that was conditioned according to this invention was a copper-gold ore containing 2.83 percent of copper and 2 ounces of gold per ton. This had been chloridized so that it contained 2.78 percent of water soluble copper, and 1.08 percent of water soluble iron. This product was mixed with $CaCO_3$ equivlaent to the cholrine of the soluble iron, the mixture was made quasi-wet and contacted with air during 3½ hours at about 60° C. The solubility of the copper was not changed substantially, but the soluble iron was decreased to but 0.03 percent.

The foregoing tests show that hydrolyzable salts of volatile acids, e. g. chlorides, can be rapidly and almost completely broken down by the practice of this invention to convert them to insoluble non-interfering forms, while simultaneously increasing, or at least not adversely affecting, the yield of desired metal values. The invention is applicable also to the conditioning of ores containing as interfering compounds small amounts of soluble sulfates, or residual sulfides which are convertible to sulfates. These salts of non-volatile acids, however, are more difficult to hydrolyze than salts of volatile acids. The procedure described, while capable of useful results, therefore requires longer treatment, and may not be completely efficient even though a base be added to neutralize the non-volatile acid as it is released.

A further important feature of the invention resides in my discovery of a mode of applying its conditioning treatment to ores containing as interfering compounds salts of non-volatile acids. In this embodiment there is added to the ore an agent which combines with the non-volatile acid radical of the salt with liberation of a volatile acid, e. g. hydrogen chloride, and thus it may be considered to represent another aspect of such addition as described previously. Otherwise the procedure is identical with that used in treating salts of volatile acids. For example, the ore may be mixed with a chloride, such as calcium or sodium chloride, which in the presence of moisture acts as follows:

$$FeSO_4 + CaCl_2 = FeCl_2 + CaSO_4$$
$$Fe_2(SO_4)_3 + 3\, CaCl_2 = 2\, FeCl_3 + 3\, CaSO_4$$

Similar reactions occur with other chlorides. The iron chloride then is hydrolyzed to form hydroxide and volatile acid as in the preceding embodiment, and the acid is removed in any manner described hereinabove, an oxidizing gas being preferably used to convert any $FeCl_2$ to $FeCl_3$. This renders the process as rapid and as efficient as in the case of treating chlorides. Lime, CaO, may also be added to fix the volatile acid (e. g. HCl) to form $CaCl_2$, which will then act with respect to non-volatile acids in the manner explained.

This embodiment may be understood further by reference to the following examples.

An ore containing 1.10 percent of copper, and 2.6 percent of nickel was chloridized, and the calcine contained 0.73 percent of sulfur as soluble sulfate. The calcine was divided into three parts. One portion (A) was rendered quasi-wet with 10 percent of water, and was mixed with 4 percent of finely ground limestone. A second portion (B) was rendered quasi-wet with 10 percent of an aqueous 20 percent solution of calcium chloride. Portions A and B were treated in accordance with this invention by heat treating them for one and a half hours with an atmosphere of air and chlorine at a temperature ranging from 100° C. initially to 180° C. at the end. The third portion (C) of the calcine was rendered quasi-wet with 10 percent of an aqueous solution containing 20 percent of calcium chloride, and was heat treated from a temperature of 100° C. to 160° C. for one and a half hours in an atmosphere of chlorine. The results appear in the following tabulation:

|  | Untreated calcine | Conditioned product | | |
| --- | --- | --- | --- | --- |
|  |  | Portion A | Portion B | Portion C |
| Soluble copper | 1.03% | 1.02% | 1.04% | 1.03% |
| Soluble nickel | 2.47% | 2.53% | 2.57% | 2.56% |
| Soluble iron | 0.78% | 0.41% | 0.06% | 0.03% |
| Soluble sulfur | 0.73% | 0.47% | 0.17% | 0.15% |

These results show that the invention is useful without applying the embodiment last described, since the short treatment (1.5 hours) applied to portion A reduced the soluble iron very substantially and effected an appreciable increase in the soluble nickel, while not adversely affecting the solubility of the copper. A longer treatment will improve the results. Portions B and C illustrate the substantial advantage to be derived from the embodiment last described when applied to ores containing interfering salts of non-volatile acids. Thus, in the case of portion B the solubility of the iron has been reduced to almost zero, without affecting the copper, but increasing the nickel content almost to theoretical solubility. Portion C is of interest in that it illustrates the benefit to be derived from the use of chlorine alone, a lower temperature being possible and the solubility of the iron being still further reduced.

In another series of tests the same ore was chloridized, and a portion of the calcine (D) was made quasi-wet with 10 percent of water and mixed with 3 percent of finely ground calcium carbonate. A second portion (E) was rendered quasi-wet with 10 percent of an aqueous 30 percent solution of calcium chloride. These mixtures were then heat treated during one and a half hours at temperatures varying from 100° C. to 175° C., using countercurrent flow of air and chlorine. The results were as follows:

|  | Untreated calcine | Conditioned product | |
| --- | --- | --- | --- |
|  |  | Portion D | Portion E |
| Soluble copper | 0.90% | 0.93% | 0.97% |
| Soluble nickel | 1.90% | 2.10% | 2.47% |
| Soluble iron | 0.78% | 0.38% | 0.10% |
| Soluble sulfur | 0.90% | 0.56% | 0.20% |

These tests confirm the conclusions to be drawn from the preceding ones, and further show the benefit to be derived from the use of countercurrent flow, this being indicated by the substantial increase in solubility of the desired metals. Tests B, C and E illustrate also the substantial reduction in soluble sulfate effected by the use of an agent which combines therewith to liberate volatile acid.

In this description reference has been made to iron as a contaminating salt in ore products that are to be leached, filtered, etc. Usually the salt is present in small amounts such as one or two percent, but it is important as well as difficult to remove those small amounts, and particularly so where leach solution is to be applied progressively to fresh bodies of ore. This invention makes possible the removal of practically all such residual contaminating salt, but even larger quantities may be removed by quasi-wetting the ore. Care is taken to maintain substantially non-acid conditions, as by an adequate supply of acid absorbent, or by acid removal with a gas current. Other salts than iron likewise are amenable to this conditioning treatment as, for instance, arsenic, antimony, bismuth or tin, and others whose salts similarly hydrolyze readily, particularly with access of air or other oxidizing agent. Thus from oxidized arsenical pyrites ore, arsenic as well as iron is removed in conditioning the ore after solubilizing treatment.

The process described in my aforementioned patent involves treatment of ore containing an -ous oxide of a metal which forms salts of varying valence, such as ferrous oxide. The ore is made quasi-wet and is treated with acidic gases to convert the -ous oxide to a salt capable of solubilizing the metal values, for instance ferrous chloride, and it is then passed through zones of progressively increasing heat to decompose the salt and cause chloridizing (or sulfatizing, as the case may be) of the metal values. In many cases the major portion of the metal values is solubilized at low temperatures during the contacting of the quasi-wet ore with acidic gases, and it then becomes necessary to break down the residual amount of ferrous salt which was not needed in solubilizing the metal values.

I have discovered that the present invention may be applied with benefit to that patented process, by using it to condition ore heated only in the intermediate temperature zones. As shown hereinabove, this will minimize the deleterious effect of residual hydrolyzable contaminating salts, and will increase the content of soluble values. This eliminates the need for heat treatment at elevated temperatures, while equally preparing the ore for leaching. The following example is illustrative of this aspect of the invention.

A copper-silver-gold ore was roasted to remove sulfur and arsenic, and was partially reduced to form -ous oxides in the calcine. It was then made quasi-wet with 10 percent of water and contacted at 100 to 110° C. with an atmosphere of air containing 7 percent of chlorine. The ore was then heat treated during 2½ hours in a revolving kiln in a counter-current of air containing a small amount of chlorine, the initial temperature being 100° C., and the final temperature 180° C. The product still retained a small amount of moisture. Before being contacted with chlorine the iron was chiefly present in the -ous condition and was highly active to chlorine and acidic gases. In this case the ore contained sufficient calcium carbonate to take care of any soluble sulfates, the carbonate probably being converted more or less to oxide during roasting and reduction, and therefore being more active to acid gases than added carbonate would be. The reactions were substantially as follows:

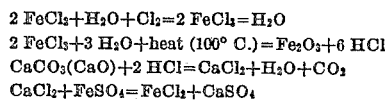

The results are shown in the following table:

| | Reduced ore before contacting | Treated ore | |
| --- | --- | --- | --- |
| | | Contacted with Cl$_2$ | Heat treated |
| | | *Solubility in water* | |
| Cu | 2.64% | 2.42% | 2.59% |
| Au | 1.8 oz./ton | 0.7 oz./ton | 1.4 oz./ton |
| Ag | 2.8 oz./ton | No silver chloride present | |
| Co | 0.5% | 0.36% | 0.42% |
| Zn | 0.55% | 0.40% | 0.45% |
| Ca | 3.2% | | |
| Fe | | 1.11% | 0.05% |
| S as SO$_4$ | | 0.73% | 0.21% |

The benefits to be derived from the practice of the invention are evident from these data, showing the remarkable reduction in soluble iron and sulfate obtained with the method of this invention as applied to ore treated preliminarily by the practice of my patented process. The washed tailings from the last test were treated with 0.1 percent cyanide solution and air for 36 hours, filtered and washed. The residue contained but a trace of gold, and but 0.2 oz. per ton of silver.

This conditioning treatment avoids the disadvantages of permitting hydrolyzable contaminating salts to continue into subsequent purification or extraction treatments that involve the application of considerable amounts of water. Moreover, this purification of the ore by hydrolysis is accelerated by the quasi-wet condition of the ore. Also absorption of acid that is released gradually during hydrolysis with increase in the solubilization of metals to be recovered, as indicated by the foregoing examples, is an important economic result of this conditioning treatment. Other important advantages will be recognized by those skilled in the art.

This application is a continuation in part of my copending application Serial No. 561,125, filed September 4, 1931.

According to the provisions of the patent statutes, I have explained the principle and mode of practicing my invention, and have described what I now consider to represent its best embodiment. However, I desire to have it understood that, within the scope of the appended claims, the invention may be practiced otherwise than as specifically described.

I claim:

1. In hydrometallurgical treatment of an oxidized ore containing a hydrolyzable salt which is decomposed in water with formation of free acidity and which normally interferes with such hydrometallurgical treatment, for example by forming a gelatinous hydroxide, or hydrated oxide, which interferes with leaching, filtration and other operations with water, the step of conditioning such ore for such hydrometallurgical treatment comprising introducing limited amounts of water to the ore to form a quasi-wet mixture, retaining the mixture under substantially neutral conditions for a time to hydrolyze said salt and convert it to insoluble form, and during hydrolysis removing free acid as it is released by hydrolysis of said salt, and thereby obtaining conditioned ore product in loose, friable and permeable condition suitable for satisfactory hydrometallurgical treatment.

2. In hydrometallurgical treatment of an oxidized ore containing a hydrolyzable salt which is decomposed in water with formation of free acidity and which normally interferes with such hydrometallurgical treatment, for example by forming a gelatinous hydroxide, or hydrated oxide, which interferes with leaching, filtration and other operations with water, the step of conditioning such ore for such hydrometallurgical treatment comprising introducing limited amounts of water to the ore to form a quasi-wet-mixture, retaining the mixture under substantially neutral conditions for a time to hydrolyze said salt and form insoluble compounds thereof, and during said hydrolysis passing a current of gas over the ore to continuously remove free acid as it is released by hydrolysis of said salt, and thereby obtaining conditioned ore in loose, friable and permeable condition suitable for satisfactory hydrometallurgical treatment.

3. In hydrometallurgical treatment of an oxidized ore containing a hydrolyzable salt which is decomposed in water with formation of free acidity and which normally interferes with such hydrometallurgical treatment, for example by forming a gelatinous hydroxide, or hydrated oxide, which interferes with leaching, filtration and other operations with water, the step of conditioning such ore for such hydrometallurgical treatment comprising introducing limited amounts of water to the ore to form a quasi-wet mixture, contacting said mixture with a gaseous oxidizing agent to convert any hydrolyzable salt in -ous state to the -ic state, retaining the mixture under substantially neutral conditions to convert said salt to an insoluble form, and during hydrolysis continuously removing from the mixture free acid as it is formed, and thereby obtaining conditioned ore product in loose, friable and permeable condition suitable for satisfactory hydrometallurgical treatment.

4. In hydrometallurgical treatment of an oxidized ore containing a hydrolyzable salt which is decomposed in water with formation of free acidity and which normally interferes with such hydrometallurgical treatment, for example by forming a gelatinous hydroxide, or hydrated oxide, which interferes with leaching, filtration and other operations with water, the step of conditioning such ore for such hydrometallurgical treatment comprising introducing limited amounts of water to the ore to form a quasi-wet mixture, adding to the mixture a reagent to combine with the acid radical of said salt as it is released by hydrolysis with said water, and retaining the mixture under substantially neutral conditions and for a time to form insoluble compounds from said hydrolyzable salt, and thereby obtaining conditioned ore product in loose, friable and permeable condition suitable for satisfactory hydrometallurgical treatment.

5. In hydrometallurgical treatment of an oxidized ore containing a hydrolyzable contaminating salt which is decomposed in water with formation of free acidity and which normally interferes with such hydrometallurgical treatment, for example by forming a gelatinous hydroxide, or hydrated oxide, which interferes with leaching, filtration and other operations with water, or by contaminating leaching solutions, the step of conditioning such ore for such hydrometallurgical treatment comprising introducing limited amounts of water to the ore to form a quasi-wet mixture, contacting the mixture with an oxidizing agent to oxidize to the -ic state any hydrolyzable contaminating salt present in the -ous state, and continuously removing from the mixture free acid as it is formed by hydrolysis of said salt to maintain the mixture substantially neutral, and continuing to remove said free acid for a time to form insoluble compounds of said hydrolyzable contaminating salt, and thereby obtaining conditioned ore product in loose, friable and permeable condition suitable for satisfactory hydrometallurgical treatment and the production of leaching solutions substantially free from said hydrolyzable salt.

6. A process according to claim 5 in which said oxidizing agent comprises a current of gaseous chlorine.

7. In hydrometallurgical treatment of an oxidized ore containing a hydrolyzable contaminating salt which is decomposed in water with formation of free acidity and which normally interferes with such hydrometallurgical treatment, for example by forming a gelatinous hydroxide, or hydrated oxide, which interferes with leaching, filtration and other operations with water, or by contaminating leaching solutions, the step of conditioning such ore for such hydrometallurgical treatment comprising introducing limited amounts of water to the ore to form a quasi-wet mixture, continuously removing free acid released by hydrolysis of said salt to provide substantially neutral conditions in the mixture, contacting the mixture with a gaseous oxidizing agent to oxidize to the -ic state any hydrolyzable contaminating salt present in the -ous state, and retaining the mixture under said substantially neutral conditions for a time and in an atmosphere containing water vapor to form insoluble compounds of said salt, and thereby obtaining conditioned ore product in loose, friable and permeable condition suitable for satisfactory hydrometallurgical treatment and the production of leaching solutions substantially free from said hydrolyzable salt.

8. In hydrometallurgical treatment of an oxidized ore containing a hydrolyzable contaminating salt which is decomposed in water with formation of free acidity and which normally interferes with such hydrometallurgical treatment, for example by forming a gelatinous hydroxide, or hydrated oxide, which interferes with leaching, filtration and other operations with water, or by contaminating leaching solutions, the step of conditioning such ore for such hydrometallurgical treatment comprising introducing limited amounts of water to the ore to form a quasi-wet mixture, agitating the mixture and gradually heating it to a temperature below about 250° C. for a time to form insoluble compounds from said salt, and continuously removing free acid released by hydrolysis of said salt, and thereby obtaining conditioned ore product in loose, friable and permeable condition suitable for satisfactory hydrometallurgical treatment and the production of leaching solutions substantially free from said hydrolyzable salt.

9. In hydrometallurgical treatment of an oxidized ore containing a hydrolyzable contaminating salt which is decomposed in water with formation of free acidity and which normally interferes with such hydrometallurgical treatment, for example by forming a gelatinous hydroxide, or hydrated oxide, which interferes with leaching, filtration and other operations with water, or by contaminating leaching solutions, the step of conditioning such ore for such hydrometallurgical treatment comprising introducing limited amounts of water to the ore to form a quasi-wet mixture, retaining the mixture under substantially neutral conditions for a time to form insoluble compounds of said hydrolyzable contaminating salt while flowing a gaseous oxidizing agent in contact with the ore to oxidize to the -ic state any hydrolyzable contaminating salt present in the -ous state and to remove acid volatile at the temperature of treatment and released during treatment, whereby to obtain conditioned ore product of loose, friable and permeable character suitable for satisfactory hydrometallurgical treatment and the production of leaching solutions substantially free from said hydrolyzable salt.

10. In hydrometallurgical treatment of an oxidized ore containing a hydrolyzable contaminating salt which is decomposed in water with formation of free acidity and which normally interferes with such hydrometallurgical treatment, for example by forming a gelatinous hydroxide, or hydrated oxide, which interferes with leaching, filtration and other operations with water, or by contaminating leaching solutions, the step of conditioning such ore for such hydrometallurgical treatment comprising introducing limited amounts of water to the ore to form a quasi-wet mixture, retaining the mixture under substantially neutral conditions for a time to form insoluble compounds of said hydrolyzable contaminating salt and during this time flowing air in contact with the ore to remove acid volatile at the temperature of treatment and released during treatment, whereby to obtain conditioned ore product of loose, friable and permeable character suitable for satisfactory hydrometallurgical treatment and the production of leaching solutions substantially free from said hydrolyzable salt.

11. In hydrometallurgical treatment of an oxidized ore containing a hydrolyzable contaminating salt which is decomposed in water with formation of free acidity and which normally interferes with such hydrometallurgical treatment, for example by forming a gelatinous hydroxide, or hydrated oxide, which interferes with leaching, filtration and other operations with water, or by contaminating leaching solutions, the step of conditioning such ore for such hydrometallurgical treatment comprising introducing limited amounts of water to the ore to form a quasi-wet mixture, retaining the mixture under substantially neutral conditions for a time to form insoluble compounds of said hydrolyzable contaminating salt while flowing a gaseous oxidizing agent comprising chlorine in contact with the ore to oxidize to the -ic state any hydrolyzable contaminating salt present in the -ous state and to remove acid volatile at the temperature of treatment and released during treatment, whereby to obtain conditioned ore product of loose, friable and permeable character suitable for satisfactory hydrometallurgical treatment and the production of leaching solutions substantially free from said hydrolyzable salt.

12. In hydrometallurgical treatment of an oxidized ore containing a hydrolyzable contaminating salt which is decomposed in water with formation of free acidity and which normally interferes with such hydrometallurgical treatment, for example by forming a gelatinous hydroxide, or hydrated oxide, which interferes with leaching, filtration and other operations with water, or by contaminating leaching solutions, the step of conditioning such ore for such hydrometalurigcal treatment comprising introducing limited amounts of water to the ore to form a quasi-wet mixture, contacting the mixture with a gaseous oxidizing agent of the group comprising air, chlorine, and mixtures thereof, and retaining the ore mixture under substantially neutral conditions by removing acid liberated during treatment, whereby to convert said hydrolyzable compounds to insoluble form and obtain conditioned ore of loose, friable and permeable character suitable for satisfactory hydrometallurgical treatment and the production of leaching solutions substantially free from said hydrolyzable salt.

13. In hydrometallurgical treatment of an oxidized ore containing a hydrolyzable contaminating salt which is decomposed in water with formation of free acidity and which normally interferes with such hydrometallurgical treatment, for example by forming a gelatinous hydroxide, or hydrated oxide, which interferes with leaching, filtration and other operations with water, or by contaminating leaching solutions, the step of conditioning such ore for such hydrometallurgical treatment comprising mixing the ore with limited amounts of water to render it quasi-wet, and heating the ore to a temperature not exceeding about 200° C. while continuously removing acid volatile at the temperature of treatment and liberated during treatment, whereby to convert said salt to insoluble form and to obtain a conditioned product of loose, friable and permeable character suitable for satisfactory hydrometallurgical treatment and the production of leaching solutions substantially free from said hydrolyzable salt.

14. In hydrometallurgical treatment of an oxidized ore containing a hydrolyzable contaminating salt which is decomposed in water with formation of free acidity and which normally interferes with such hydrometallurgical treatment, for example by forming a gelatinous hydroxide or hydrated oxide, which interferes with leaching, filtration and other operations with water, or by contaminating leaching solutions, the step of conditioning such ore for such hydrometallugical treatment comprising introducing limited amounts of water to the ore to form a quasi-wet mixture, retaining the mixture under substantially neutral conditions for a time to form insoluble compounds of said hydrolyzable contaminating salt while progressively heating the ore to a temperature below about 200° C. and during this time flowing a gaseous oxidizing agent in contact with the ore to oxidize to the -ic state any hydrolyzable contaminating salt present in the -ous state and to continuously remove acid volatile at the temperature of treatment and released during treatment, whereby to obtain conditioned ore product of loose, friable and permeable character suitable for satisfactory hydrometallurgical treatment and the production of leaching solutions substantially free from said hydrolyzable salt.

15. In hydrometallurgical treatment of an oxidized ore containing a hydrolyzable contaminating salt which is decomposed in water with formation of free acidity and which normally interferes with such hydrometallurgical treatment, for example by forming a gelatinous hydroxide, or hydrated oxide, which interferes with leaching, filtration and other operations with water, or by contaminating leaching solutions, the step of conditioning such ore for such hydrometallurgical treatment comprising introducing limited amounts of water to the ore to form a quasi-wet mixture, advancing a stream of the mixture with progressive increase of temperature up to as high as about 200° C. for hydrolytic reaction of said salt under substantially neutral conditions to convert said hydrolyzable contaminating salt to insoluble form, and continuously removing acid volatile at the temperature of treatment and liberated during treatment by flowing a stream of gas countercurrently to the ore, to obtain a conditioned ore product of loose, friable and permeable character suitable for satisfactory hydrometallurgical treatment and the production of leaching solutions substantially free from said hydrolyzable salt.

16. In hydrometallurgical treatment of an oxidized ore containing a hydrolyzable contaminating salt of a volatile acid which is decomposed in water with formation of free acidity and which normally interferes with such hydrometallurgical treatment, for example by forming a gelatinous hydroxide, or hydrated oxide, which interferes with leaching, filtration and other operations with water, or by contaminating leaching solutions, the step of conditioning such ore for such hydrometallurgical treatment comprising mixing the ore with limited amounts of water to render it quasi-wet, heating the ore to a temperature below about 200° C. while moving it countercurrently to a current of gas of the group comprising air, chlorine, and mixtures thereof to continuously remove acid volatile at the temperature of treatment and liberated during treatment and maintain the ore under substantially neutral conditions and to oxidize to the -ic state any hydrolyzable contaminating salt present in the -ous state, whereby to convert said salt to insoluble form and obtain conditioned ore of loose, friable and permeable character suitable for satisfactory hydrometallurgical treatment and the production of leaching solutions substantially free from said hydrolyzable salt.

17. In hydrometallurgical treatment of an oxidized ore containing a hydrolyzable sulfate which is decomposed in water with formation of free acidity and which normally interferes with such hydrometallurgical treatment, for example by forming a gelatinous hydroxide, or hydrated oxide, which interferes with leaching filtration and other operations with water, or by contaminating leaching solutions the step of conditioning such ore for such hydrometallurgical treatment comprising mixing the ore with limited amounts of water to render it quasi-wet, adding to the mixture a soluble chloride adapted to react with said sulfate to convert it to hydrolyzable chloride, and continuously removing hydrochloric acid as it is formed by hydrolysis of said hydrolyzable chloride, and thereby obtaining conditioned ore of loose, friable and permeable character suitable for satisfactory hydrometallurgical treatment and the production of leaching solutions substantially free from the metal of said hydrolyzable sulfate.

18. In hydrometallurgical treatment of an oxidized ore containing a hydrolyzable sulfate which is decomposed in water with formation of free acidity and which normally interferes with such hydrometallurgical treatment, for example by forming a gelatinous hydroxide, or hydrated oxide, which interferes with leaching, filtration and other operations with water, or by contaminating leaching solutions, the step of conditioning such ore for such hydrometallurgical treatment comprising mixing the ore with limited amounts of water to render it quasi-wet, adding to the mixture a soluble chloride adapted to react with said sulfate to convert it to hydrolyzable chloride, heating the mixture to a temperature below about 200° C., and continuously removing hydrochloric acid as it is formed by hydrolysis of said hydrolyzable chloride, and thereby obtaining conditioned ore of loose, friable and permeable character suitable for satisfactory hydrometallurgical treatment and the production of leaching solutions substantially free from the metal of said hydrolyzable sulfate.

19. In hydrometallurgical treatment of an oxidized ore containing a hydrolyzable metal sulfate which is decomposed in water with formation of free acidity and which normally interferes with such hydrometallurgical treatment, for example by forming a gelatinous hydroxide, or hydrated oxide, which interferes with leaching, filtration and other operations with water, or by contaminating leaching solutions, the step of conditioning such ore for such hydrometallurgical treatment comprising mixing the ore with limited amounts of water to render it qasi-wet, and with a soluble chloride, such as sodium chloride or magnesium chloride, adapted to react with said sulfate to convert it to a hydrolyzable chloride, contacting the ore with a gaseous oxidizing agent to convert to the -ic state any of said hydrolyzable chloride present in the -ous state, and heating to a temperature below about 200° C. while continuously removing hydrochloric acid liberated by hydrolysis of said chloride, and thereby converting said metal to insoluble form and obtaining conditioned ore of loose, friable and permeable character suitable for satisfactory hydrometallurgical treatment and the production of leaching solutions substantially free from the metal of said hydrolyzable sulfate.

20. In hydrometallurgical treatment of an oxidized ore containing a hydrolyzable sulfate which is decomposed in water with formation of free acidity and which normally interferes with such hydrometallurgical treatment, for example by forming a gelatinous hydroxide, or hydrated oxide, which interferes with leaching, filtration and other operations with water, or by contaminating leaching solutions, the step of conditioning such ore for such hydrometallurgical treatment comprising mixing the ore with limited amounts of water to render it quasi-wet, and with a soluble chloride adapted to react with said sulfate to convert it to chloride, such as sodium or calcium chloride, and heating the mixture to a temperature below about 200° C. while moving it countercurrently to a stream of gas to carry off free hydrochloric acid as it is liberated by hydrolysis of said chloride, and thereby converting said metal to insoluble form and obtaining conditioned ore of loose, friable and permeable character suitable for satisfactory hydrometallurgical treatment and the production of leaching solutions substantially free from the metal of said hydrolyzable salt.

21. A process according to claim 20, said gas comprising air, chlorine, or mixtures thereof.

22. The process of conditioning for hydrometallurgical treatment an oxidized ore containing metal chloride to be recovered and residual iron in the form of a soluble hydrolyzable salt, comprising introducing limited amounts of water to the ore to form a quasi-wet mixture, and while retaining the mixture in contact with air continuously removing free acid formed by hydrolysis of the soluble iron salt, and thereby converting the iron to insoluble form and providing conditioned ore of loose, friable and permeable character suitable for hydrometallurgical treatment.

23. In hydrometallurgical treatment of an oxidized ore containing a hydrolyzable metal sulfate which is decomposed in water with formation of free acidity and which normally interferes with such hydrometallurgical treatment, for example by forming a gelatinous hydroxide, or hydrated oxide, which interferes with leaching, filtration and other operations with water, or by contaminating leaching solutions, the step of conditioning such ore for such hydrometallurgical treatment comprising mixing the ore with a limited amount of water to render it quasi-wet, a soluble chloride adapted to react with said sulfate to convert it to a hydrolyzable chloride, and with a reagent to combine with acid released by hydrolysis of said hydrolyzable chloride by said water, and holding the mixture at a temperature below about 200° C. until said hydrolysis is complete, said reagent continuously fixing hydrochloric acid as it is liberated and maintaining the mixture substantially neutral, and thereby converting said metal to insoluble form and obtaining conditioned ore of loose, friable and permeable character suitable for satisfactory hydrometallurgical treatment and the production of leaching solutions substantially free from the metal of said hydrolyzable sulfate.

24. The process of conditioning for hydrometallurgical treatment an oxidized ore containing soluble metal values to be recovered and residual iron sulfate, comprising introducing limited amounts of water to the ore to form a quasi-wet mixture, mixing these with a soluble chloride, such as sodium or magnesium chloride, adapted to react with said sulfate, and heating the mixture to below about 200° C. while removing hydrochloric acid from the mixture as it is formed and while flowing over the mixture a current of air, and thereby obtaining conditioned ore of loose, friable and permeable character and substantially free from water-soluble iron.

25. In hydrometallurgical treatment of an oxidized ore containing a hydrolyzable sulfate which is decomposed in water with formation of free acidity and which normally interferes with such hydrometallurgical treatment, for example by forming a gelatinous hydroxide, or hydrated oxide, which interferes with leaching filtration and other operations with water, or by contaminating leaching solutions, the step of conditioning such ore for such hydrometallurgical treatment comprising mixing the ore with a solution of a soluble chloride adapted to react with said sulfate to convert it to hydrolyzable chloride, said solution being used in an amount such as to render the ore quasi-wet, and continuously removing hydrochloric acid as it is formed by hydrolysis of said hydrolyzable chloride, and thereby obtaining conditioned ore of loose, friable and permeable character suitable for satisfactory hydrometallurgical treatment and the production of leaching solutions substantially free from said hydrolyzable salt.

In testimony whereof, I sign my name.

RALPH F. MEYER.